United States Patent [19]

Mason et al.

[11] Patent Number: 5,204,081
[45] Date of Patent: Apr. 20, 1993

[54] PROCESS FOR THE GENERATION OF CHLORINE DIOXIDE

[75] Inventors: John Y. Mason, Plymouth, Calif.; Edward J. Bechberger, Etobicoke, Canada; Dorman N. Matchim, Citrus Heights; Dick L. Hilliard, Orangevale, both of Calif.

[73] Assignee: Rio Linda Chemical Co., Ltd., Sacramento, Calif.

[21] Appl. No.: 695,217

[22] Filed: May 3, 1991

[51] Int. Cl.$^5$ .................................... C01B 11/02
[52] U.S. Cl. .................................... 423/478; 423/477
[58] Field of Search ................................ 423/477, 478

[56] References Cited

U.S. PATENT DOCUMENTS

| | | | |
|---|---|---|---|
| 3,789,108 | 1/1974 | Rapson | 423/477 |
| 3,920,801 | 11/1975 | Grotheer | 423/477 |
| 4,247,531 | 1/1981 | Hicks | 423/477 |
| 4,414,193 | 11/1983 | Fredette et al. | 423/478 |
| 4,534,952 | 8/1985 | Rapson et al. | 423/478 |

OTHER PUBLICATIONS

Linus Pauling, "The Nature of The Chemical Bond", 1940, pp. 42–43.

Primary Examiner—Gary P. Straub
Assistant Examiner—Valerie Lund
Attorney, Agent, or Firm—Leonard Bloom

[57] ABSTRACT

A process for the rapid generation of chlorine dioxide under reduced pressure. A reaction column having a venturi therein and a reaction chamber in fluid communication with the nozzle of the venturi is provided. An aqueous chlorate solution and a gaseous stream of acid are introduced into the reaction chamber to react and form chlorine dioxide. A driving medium is introduced into the venturi, and the chlorine dioxide from the reaction chamber is mixed with the driving medium at the outlet of the venturi. The chlorine dioxide/driving medium mixture is passed through a reaction column. In an alternate embodiment, a chlorite solution is introduced into the reaction chamber together with the chlorate solution and the gaseous stream of acid. In a further embodiment, a chlorite solution is introduced into the reaction column after mixing of the driving medium with the chlorine dioxide.

13 Claims, 3 Drawing Sheets

PROCESS FOR THE GENERATION OF CHLORINE DIOXIDE

FIELD OF THE INVENTION

This invention relates to the production of chlorine dioxide and more particularly to an inexpensive, simple method of rapidly producing high yields of chlorine dioxide.

BACKGROUND OF THE INVENTION

Chlorine dioxide has been used in a variety of applications subsequent to its discovery in 1811 by Sir Humphry Davey. Applications that are commercially used today include the bleaching of wood pulp for paper making; bleaching of textile, flour, flower, cherry, tallow, and recycled paper; disinfection of industrial process water, drinking water, waste water, and food contact surfaces; use as a disinfectant and odor control agent in a variety of industries and applications; use for the destruction of pollutants such as cyanide and phenols; and use of its oxidation powers for industrial process purposes.

Chlorine dioxide use has become popular in many of these applications because of its strong oxidation power, quick and broad biocidal capability, and its ability to oxidize without the formation of unwanted chlorination by-products.

The one drawback to chlorine dioxide is that, because of its tendency to explode when compressed or stored in concentrations of over 10 percent, it must be produced on-site prior to use rather than produced at a central location and shipped to the point of use. This has lead to a variety of generation processes for its production. The two basic types of processes are differentiated by use of either sodium chlorite or sodium chlorate as the precursor chemical.

Sodium chlorite based processes are, in general, small, safe and very easy to operate. There are several patents disclosing these types processes. U.S. Pat. No. 4,250,144, issued to Ratigan, describes a process for the reaction of dissolved chlorine (hypochlorous acid) in water with sodium chlorite. U.S. Pat. No. 4,590,057, issued to Hicks, discloses a process where molecular chlorine is reacted directly with sodium chlorite prior to dilution in water to form chlorine dioxide. Though these are by far the two most common chlorite based methods, there are a profusion of other chlorite based methods that react sodium chlorite with various acids or oxidizers to form chlorine dioxide. Though they all are relatively simple to operate when compared to the chlorate based processes, the chlorine dioxide produced from chlorite is inherently from 4 to 5 times as expensive as that produced from a chlorate based process. Sodium chlorite is much more expensive to produce than sodium chlorate. Industries where chlorite based process are used are the water disinfecting, food, and industrial water treatment sectors where typical use capacities are under 2,000 lbs. per day.

Sodium chlorate based process are, in general, much larger and more complex to operate than a chlorite based process. U.S. Pat. No. 3,920,801 issued to Grotheer describes an electrolytic cell process where sodium chlorate is reacted through a cascade system with hydrochloric acid and heat to produce chlorine dioxide and chlorine. U.S. Pat. No. 4,081,520 issued to Swindells et al, describe a process where sodium chlorate is reacted with a mixture of liquid sulfuric acid and methanol to form chlorine dioxide. U.S. Pat. No. 3,755,068, issued to Rapson, describes a process where sodium chlorate is reacted with a mixture of sodium chloride and acid to form chlorine dioxide and chlorine. U.S. Pat. No. 2,373,870, issued to Holst, discloses a process where sulfuric acid is reacted with sodium chlorate and sulfur dioxide to form chlorine dioxide.

Sodium chlorate reactors are extremely capital intensive, with generator costs ranging from $2,500,000.00 to $10,000,000.00 compared with $3,500.00 to $100,000.00 for chlorite based processes. Chlorate units also require constant operator supervision where chlorite based process operate for months on end without operator supervision. The chlorite generator because of its small reaction column, vacuum chemical feed, and simplicity is safer, and produces a more pure chlorine dioxide stream than the chlorate based unit.

Because of the cost and operational differences of the chlorite and chlorate based processes, there has been a tremendous drive to "downscale" chlorate processes to chlorite generation systems. Though there have been several patents granted on these systems, none has been commercially successful. An example of these would be U.S. Pat. No. 4,451,444, issued to Santillie et al. This is because of the inherent nature of the reactants used require longer reaction times than the chlorite based processes. Retention time in a chlorite based process varies from minimal (<0.5 seconds) in the Hicks et al process to a maximum of 15 minutes as described in the acid chlorite type processes. These reactions are carried out at room temperature. In contrast the chlorate based processes allow for 2 to 4 hours of retention time, or use multiple pass reactors such as described by Day et al, U.S. Pat. No. 2,484,402, and operate at temperatures commonly exceeding 90° C.

SUMMARY OF THE INVENTION

The instant invention provides a process for the efficient and comparatively inexpensive production of high yields of chlorine dioxide. The process is useable on-site and reacts an aqueous solution of chlorate with a gaseous stream of an acid in a reaction column. The reaction product is primarily chlorine dioxide and is formed almost instantaneously.

It is therefore an object of this invention to provide for a process where a chlorate solution and an acid in gaseous form are mixed together under a vacuum prior to dilution in a water stream to form a mixture of chlorine dioxide and chlorine.

It is another object of this invention to provide for a process where a sodium chlorate solution and hydrogen chloride gas are mixed together under a vacuum prior to dilution in a water stream with a subsequent addition of sodium chlorite to form a product stream that is predominantly chlorine dioxide.

It is further object of this reaction to provide for a process where sodium chlorate is reacted with an acid mixture where a substantial amount of the mixture is made up of anhydrous hydrogen chloride.

Another object of this invention is to provide for a process where chlorine dioxide and mixtures of chlorine dioxide and other compounds are formed by the substantially instantaneous reaction of sodium chlorate with one or more compounds where the reaction takes place under vacuum prior to the addition of a substantial amount of dilution water.

Yet another object of this invention is to provide for process where one or more chemicals is reacted with chlorate in a reaction column with less than 5 minutes retention time to form chlorine dioxide or a mixture of chlorine dioxide and other oxidants.

In accordance with the teachings of the present invention, there is disclosed a process for the rapid preparation of chlorine dioxide under reduced pressure, wherein an aqueous chlorate solution is mixed with a gaseous stream of an acid. A reaction column having a venturi nozzle therein is provided. The venturi nozzle has an inlet and an outlet. A reaction chamber is connected to the reaction column adjacent to the venturi nozzle. The reaction chamber is in fluid communication with the outlet of the venturi nozzle. Aqueous chlorate solution is introduced into the reaction chamber. The gaseous stream of acid is introduced into the reaction chamber concurrently with introduction of the chlorate solution. When these reagents are mixed, chlorine dioxide is rapidly produced within the reaction chamber. The chlorine dioxide is transferred to the reaction column at the outlet of the venturi nozzle and a driving medium is introduced into the inlet of the venturi nozzle such that mixture of the driving medium and the chlorine dioxide takes place in the reaction column at the outlet of the venturi nozzle.

In a preferred embodiment, the chlorate is sodium chlorate, the acid is anhydrous hydrochloric acid and the driving medium is water.

In another preferred embodiment, an aqueous chlorite solution is also introduced into the reaction chamber concurrently with the chlorate solution and the gaseous acid.

In yet another preferred embodiment, an aqueous chlorite solution is introduced into the reaction column subsequent to mixing of the water with the chlorine dioxide.

In still another embodiment, an aqueous chlorite solution is introduced into the driving medium.

These and other objects of the present invention will become apparent from a reading of the following specification, taken in conjunction with the enclosed drawings.

DESCRIPTION OF THE PREFERRED EMBODIMENTS

The instant invention provides a continuous, low cost, rapid process for the production of high yields of chlorine dioxide for use in disinfecting, odor controlling, bleaching and industrial applications.

Figure 1:
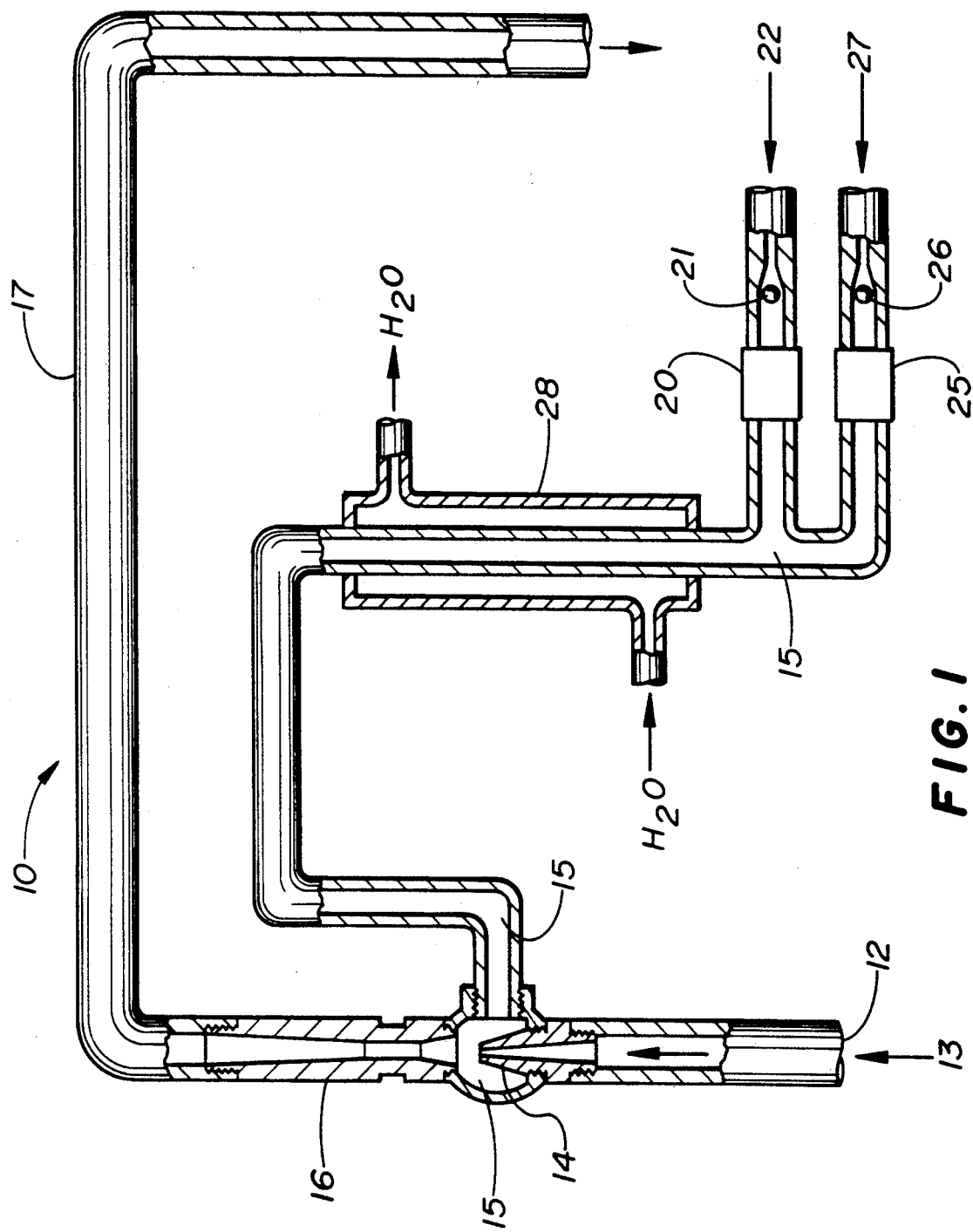
FIG. 1 is a diagrammatical representation showing the reaction column in which the reagents are introduced to prepare chlorine dioxide.

A generator 10, similar to the reactor disclosed by Hicks is U.S. Pat. No. 4,247,531, is used in the present invention. Referring now to FIG. 1, the reactor 10 includes piping or tubing having an inlet 12 for introduction of a driving medium 13 into the reactor 10. The driving medium 13 may be a fluid including a gas or a liquid such as water. The driving medium 13 enters the inlet of a venturi nozzle 14, passes through the outlet of said nozzle 14 and into a portion of a reaction chamber 15 which is in fluid communication therewith. A zone of reduced pressure is created by the flow from the restriction in the venturi nozzle into the larger chamber. Details of the reaction chamber 15 will be described later in the present application. The driving medium 13 intermixes with reactants present in the reaction chamber 15 and drives the reactants into a venturi throat 16, through the throat 16 and through the reaction column 17.

The reaction chamber 15 includes the portion surrounding the outlet of the venturi nozzle 14 and extends outwardly therefrom. The major portion of the reaction chamber 15 includes a tubing or pipe connected adjacent to the outlet of the venturi nozzle 14. The reaction chamber 15 extends outwardly from the venturi nozzle 14 and has at least two inlet ports connected thereto. A first inlet port 20 has a means 21 for controlling introduction of a first reactant 22 into the reaction chamber 15. The controlling means also excludes, from the reaction chamber 15, environmental factors such as moisture, air, etc. The controlling means may be a check valve or other means known to persons skilled in the art. The second inlet port 25 also has a means 26 for controlling introduction of a second reactant 27 and for excluding environmental factors. The controlling means 20 is capable of controlling the introduction of liquids and/or gases. A cooling jacket 28 may be disposed about the reaction chamber 17 at a location between the venturi nozzle 14 and the inlet ports 21, 25 to moderate temperatures in the reaction chamber 15, if desired. The dimensions of the reaction chamber 15 permit intimate mixing of the first reactant 22 with the second reactant 27 and also permit expansion of the reaction products. The diameter of the piping in the reaction chamber 1 is small enough to insure good mixing and velocity but large enough to prevent a significant pressure difference between the venturi nozzle 14 and the inlet ports 20, 25. In a preferred embodiment, the first reactant 22 is an aqueous solution of sodium chlorate ($NaClO_3$) and the second reactant 27 is gaseous anhydrous hydrogen chloride. These react to produce chlorine dioxide in high yield. The reaction occurs almost instantaneously, in less than one one-hundredth of a second. The reaction also produces chlorine. The use of aqueous hydrogen chloride (hydrochloric acid) has been found to be ineffective in producing chlorine dioxide under the same conditions, even when the feed rate of the hydrochloric acid (HCl) is increased six fold. Increasing the feed rate of the anhydrous hydrogen chloride by a factor of 2 or 3 so that the mole ratio of sodium chlorate to acid increased from approximately 1:2 to a ratio of 1:2.5 or 1:3 did not significantly alter the percent yield of chlorine dioxide.

The invention will be better understood by referring to the following specific examples, but it is not intended to be limited thereby.

EXAMPLE 1

A 40% w/w solution of sodium chlorate is fed into an inlet port to the reaction chamber at a rate of 207 lbs. per day of 100% $NaClO_3$. The external diameter of the chamber is ¾ inch (d), and it has a length (l) prior to entrance of the venturi nozzle outlet of 36 inches. Also fed to the chamber concurrently with the sodium chlorate solution, and into a second inlet port, is a gas stream of anhydrous hydrogen chloride at a rate of 73 lbs. per day (FIG. 1). Based upon the chlorate feed, the theoretical capacity of the generator is 131 lbs. per day of chlorine dioxide. Based upon the anhydrous HCl, the theoretical capacity of the generator is 65.5 lbs. per day chlorine dioxide. Water flow (the driving medium) through the generator is 6.9 gallons per minute. After chemical feed commences, the generator is allowed to stabilize for 1 minute prior to sampling. Sample taken are immediately analyzed by the AWWA Standard method 4500-E-ClO$_2$ except with the addition that water flow is known, allowing for the calculations of mass yields. The effluent of the generator contains 565 ppm of chlorine dioxide, 483 ppm of chlorine, 1190 ppm of chlorate, 0 chlorite, and has a pH of 2.0. This corresponds to a production rate of 46.8 lbs. per day of chlorine dioxide. Based upon chlorate feed, this is a yield of 35.7%. Based upon the anhydrous HCl feed, this corresponds to a yield of 71.5%.

EXAMPLE 2

EXAMPLE 1 is duplicated exactly except that 31% hydrochloric acid is substituted for the anhydrous HCl. A 40% w/w solution of sodium chlorate is fed into an inlet port to the reaction chamber at a rate of 207 lbs. per day of 100% NaClO$_3$. The external diameter of the chamber is ¾ inch (d), and it has a length (l) prior to entrance of the venturi nozzle outlet of 36 inches. Also fed to the chamber concurrently with the sodium chlorate solution, and into a second inlet port, is a stream of 31% hydrochloric acid at a rate of 235 lbs. per day. Please refer to FIG. 1 for configuration of the generation unit. Based upon the chlorate feed, the theoretical capacity of the generator is 131 lbs. per day chlorine dioxide. Based upon the HCl, the theoretical capacity of the generator is 65.5 lbs. per day chlorine dioxide. Water flow (the driving medium) through the generator is 6.9 gallons per minute. After chemical feed commences, the generator is allowed to stabilize for 1 minute prior to sampling. Samples taken are immediately analyzed by the AWWA Standard method 4500-E-ClO$_2$ except with the addition that water flow is known, allowing for the calculations of mass yields. The effluent of the generator contains 0 ppm of chlorine dioxide, 0 ppm of chlorine, and has a pH of less than 1.0. No reaction of any kind is observed. Even though the 31% hydrochloric acid feed rate is increased 6 times, no reaction is observed.

EXAMPLE 3

A 40% w/w solution of sodium chlorate is fed into an inlet port to the reaction chamber at a rate of 202 lbs. per day of 100% NaClO$_3$. The external diameter of the chamber is ¾ inch (d), and it has a length (l) prior to entrance of the venturi nozzle outlet of 36 inches. Also fed to the chamber concurrently with the sodium chlorate solution, and into a second inlet port, is a gas stream of anhydrous hydrogen chloride at a rate of 105 lbs. per day (FIG. 1). Based upon the chlorate feed, the theoretical capacity of the generator is 128 lbs. per day chlorine dioxide. Based upon the anhydrous HCl, the theoretical capacity of the generator is 97 lbs. per day chlorine dioxide. Water flow through the generator is 6.9 gallons per minute. After chemical feed commences, the generator is allowed to stabilize for 1 minute prior to sampling. Samples taken are immediately analyzed by the AWWA Standard method 4500-E-ClO$_2$ except with the addition that water flow is known, allowing for the calculations of mass yields. The effluent of the generator contains 1010 ppm of chlorine dioxide, 780 ppm of chlorine, 570 ppm of chlorate, 0 chlorite, and has a pH of 1.9. This corresponds to a production rate of 84.1 lbs. per day of chlorine dioxide. Based upon chlorate feed, this is a yield of 65.6%. Based upon the anhydrous HCl feed, this corresponds to a yield of 87%

EXAMPLE 4

EXAMPLE 3 is duplicated except that the sodium chlorate solution is fed at a rate of 205 lbs. per day of 100% NaClO$_3$ and the gas stream of anhydrous hydrogen chloride is fed at a rate of 150 lbs. per day. The mole ratio of NaClO$_3$ to acid is 1:2. The effluent of the generator contains 1298 ppm of chlorine dioxide and 941 ppm of chlorine. Based upon the anhydrous HCl feed, this corresponds to a yield of 82.6%.

EXAMPLE 5

EXAMPLE 3 is duplicated except that the sodium chlorate solution is fed at a rate of 205 lbs. per day of 100% NaClO$_3$ and the gas stream of anhydrous hydrogen chloride is fed at a rate of 175 lbs. per day. The mole ratio of NaClO$_3$ to acid is 1:2.5. The effluent of the generator contains 1332 ppm of chlorine dioxide and 1107 ppm of chlorine. Based upon the anhydrous HCl feed, this corresponds to a yield of 83%.

EXAMPLE 6

EXAMPLE 3 is duplicated except that the sodium chlorate solution is fed at a rate of 207 lbs. per day of 100% NaClO$_3$ and the gas stream of anhydrous hydrogen chloride is fed at a rate of 210 lbs. per day. The mole ratio of NaClO$_3$ to acid is 1:3.0. The effluent of the generator contains 1374 ppm of chlorine dioxide and 1240 ppm of chlorine. Based upon the chlorate feed, as the limiting reagent, this corresponds to a yield of 87%.

EXAMPLE 7

Increasing the size of the reaction chamber produced no significant effects. A 38% w/w solution of sodium chlorate is fed into an inlet port to the reaction chamber at a rate of 1304 lbs. per day of 100% NaClO$_3$. The external diameter of the chamber is 1.5 inch (d), and it has a length (l) prior to entrance of the venturi nozzle outlet of 48 inches. Also fed to the chamber concurrently with the sodium chlorate solution and into a second inlet port, is a gas stream of anhydrous hydrogen chloride at a rate of 900 lbs. per day (FIG. 1). Based upon the chlorate feed, the theoretical capacity of the generator is 826 lbs. per day chlorine dioxide. Based upon the anhydrous HCl the theoretical capacity of the generator is 826 lbs. per day chlorine dioxide. Water flow through the generator is 60 gallons per minute. After chemical feed commences, the generator is allowed to stabilize for 1 minute prior to sampling. Samples taken are immediately analyzed by the AWWA Standard method 4500-E-ClO$_2$ except with the addition that water flow is known, allowing for the calculations of mass yields. The effluent of the generator contains 962 ppm of chlorine dioxide, 877 ppm of chlorine, and has a pH of 2.0. This corresponds to a production rate of 708 lbs. per day of chlorine dioxide. Based upon chlorate feed this is a yield of 85.7%.

EXAMPLE 8

EXAMPLE 7 is duplicated except that the sodium chlorate solution is fed at a rate of 1,203 lbs. per day of 100% NaClO$_3$ and the gas stream of anhydrous hydrogen chloride is fed at a rate of 980 lbs. per day. The mole ratio of NaClO$_3$ to acid is 1:2.3. The effluent of the generator contains equals 927 ppm of chlorine dioxide and 718 ppm of chlorine. Based upon the chlorate feed, this corresponds to a yield of 87.7%.

EXAMPLE 9

EXAMPLE 7 is duplicated except that the sodium chlorate solution is fed at a rate of 789 lbs. per day of 100% NaClO$_3$ and the gas stream of anhydrous hydrogen chloride is fed at a rate of 938 lbs. per day. The mole ratio of NaClO$_3$ to acid is 1:3.5. The effluent of the generator contains 540 ppm of chlorine dioxide and 602 ppm of chlorine. Based upon the chlorate feed, this corresponds to a yield of 77.9%.

EXAMPLE 10

EXAMPLE 1 is repeated exactly except that nitric acid in the amount of a molar equivalent to the anhydrous HCl is also fed into the reaction chamber. Yield increased from 35%, based upon chlorate feed, to 56%, demonstrating a synergistic effect between the acids. A feed of nitric acid alone produced no reaction with the sodium chlorate.

Although Example 10 provides for the introduction of nitric acid as the additional acid, other acidic materials may be used. These acidic materials include sulfuric acid, aqueous hydrochloric acid, phosphoric acid, acetic acid, alkali earth metal dihydrogen phosphate, metal dihydrogen phosphate, alkali earth metal monohydrogen phosphate, alkali metal earth monohydrogen sulfate and metal monohydrogen sulfate.

Figure 2:
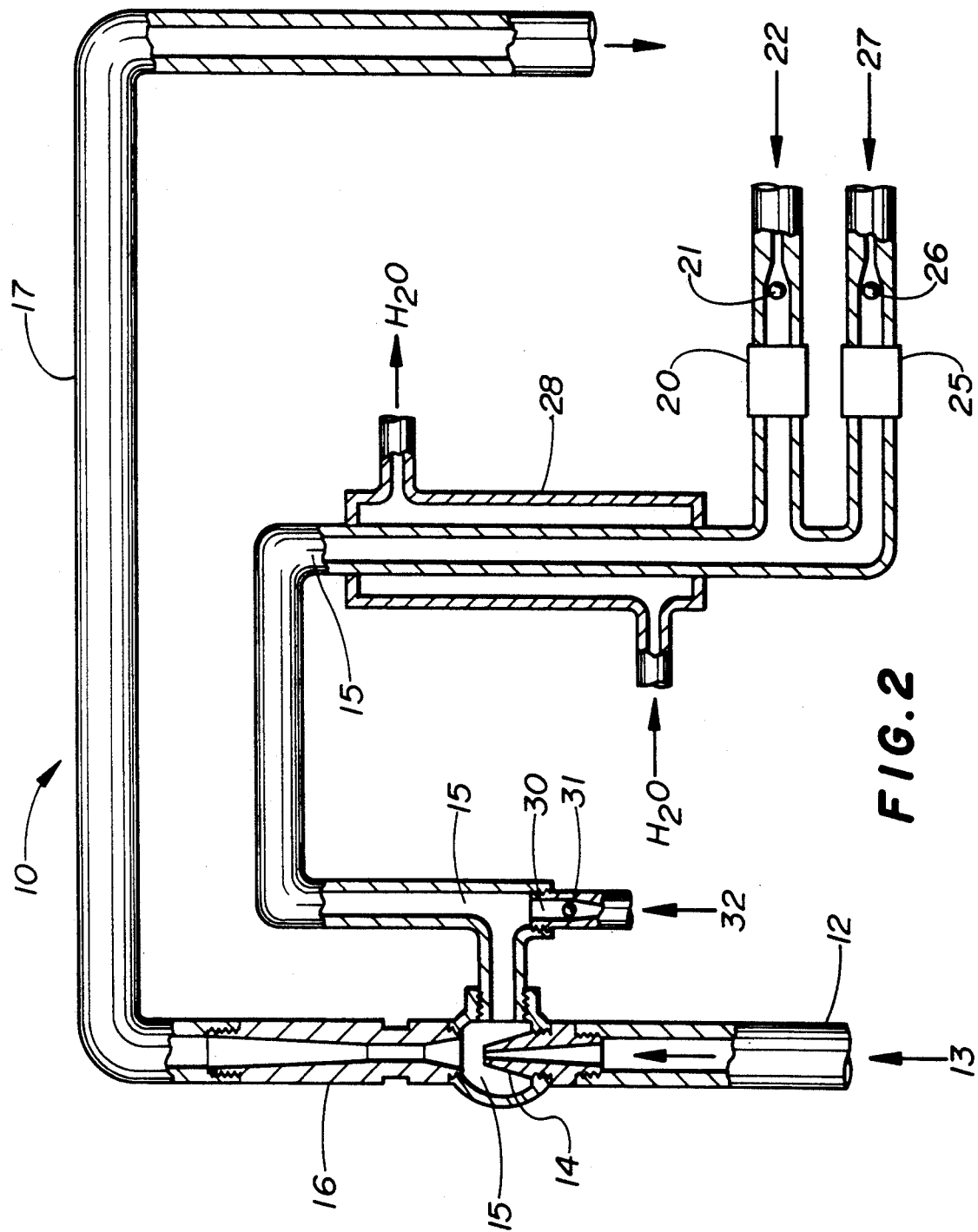
FIG. 2 is an alternate embodiment of FIG. 1 showing the introduction of a chlorite solution into the reaction chamber.

The generator 10 was further modified as shown in FIG. 2 to provide a third inlet port 30 into the reaction chamber 15 very near or adjacent to the portion of the reaction chamber which surrounds the venturi nozzle 14. The third inlet port 30 has a third means 31 of controlling the introduction of a third reactant 32 into the reaction chamber 15 so that the third reactant 32 may mix with the first reactant 22, the second reactant 27 and the reaction products, prior to the mixing with the driving medium 13. This embodiment is further exemplified as follows wherein the third reactant is aqueous sodium chlorite and the effluent from the generator contains no chlorite.

EXAMPLE 11

A 35% w/w solution of sodium chlorate is fed into an inlet port to the reaction chamber at a rate of 1,304 lbs. per day of 100% NaClO$_3$. The external diameter of the chamber is 1.5 inch (d), and it has a length (l) prior to entrance of the venturi nozzle outlet of 66 inches.

Also fed to the chamber concurrently with the sodium chlorate solution and into a second inlet port, is a gas stream of anhydrous hydrogen chloride at a rate of 900 lbs. per day. An aqueous stream of 25% NaClO$_2$ is fed into the reaction chamber through a third inlet port at a rate of 1,091 lbs. per day of 100% NaClO$_2$ (FIG. 2). The theoretical capacity of the generator is 1,640 lbs. per day chlorine dioxide. Water flow through the generator is 60 gallons per minute. After chemical feed commences the generator is allowed to stabilize for 1 minute prior to sampling. Samples taken are immediately analyzed by the AWWA standard method 4500-E-ClO$_2$ except with the addition that water flow is known, allowing for the calculations of mass yields. The effluent of the generator contains 1,332 ppm of chlorine dioxide, 630 ppm of chlorine, and 0 ppm of chlorite. This corresponds to a production rate of 980 lbs per day of chlorine dioxide and a combined chlorate-chlorite yield of 60%.

Figure 3:
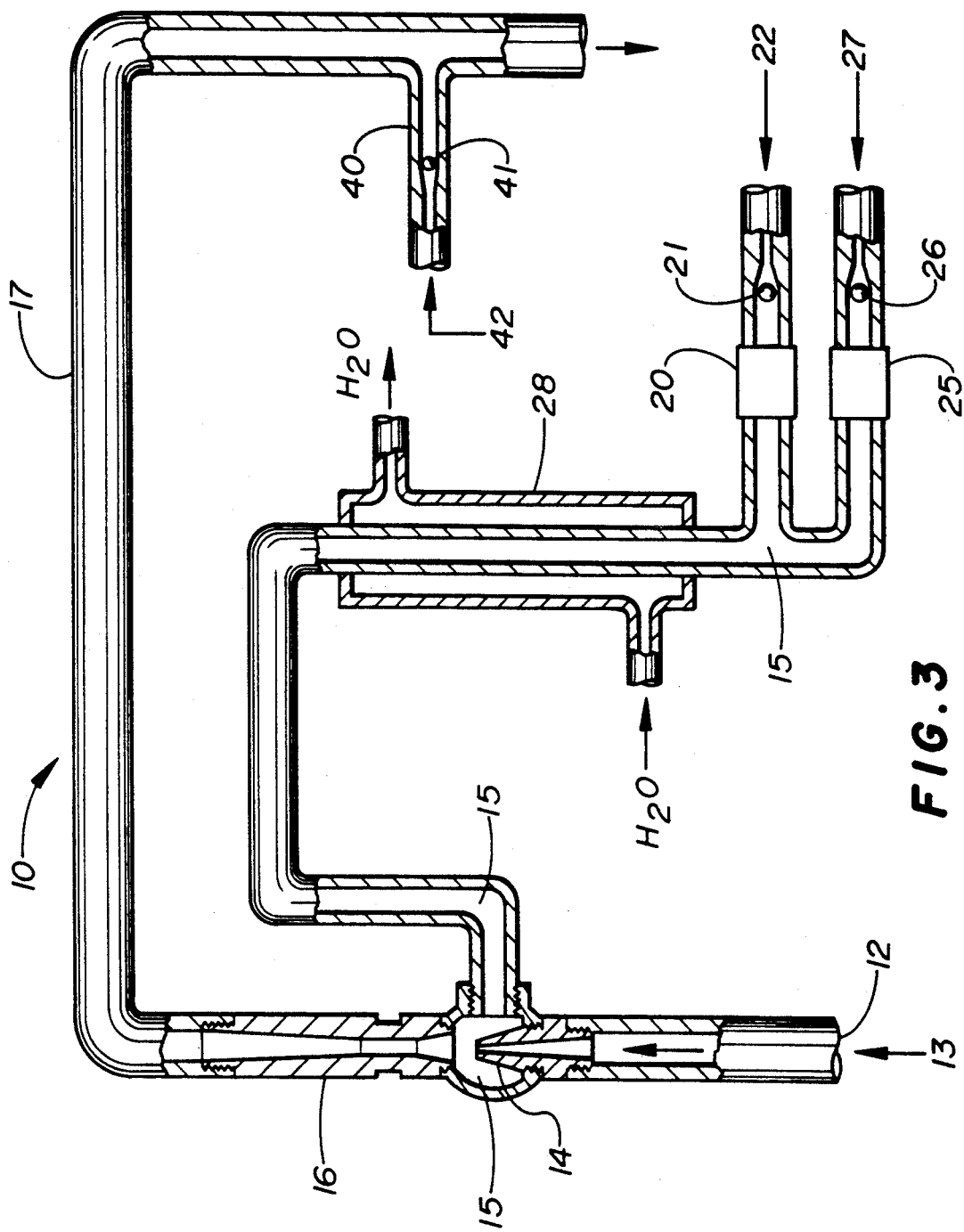
FIG. 3 is a further embodiment of FIG. 1 showing the introduction of a chlorite solution into the reaction column subsequent to the reaction chamber.

A further modification to the generator is shown in FIG. 3. An additional inlet port 40 is provided which is connected to the reaction column 17 at a point toward the end of the reaction column 17 downstream from the venturi throat 16. Included is an additional means 32 to control the introduction of an additional reactant 42 into the reaction column 17. The additional reactant 42 in the embodiment exemplified below is aqueous sodium chlorite. N chlorite is present in the effluent from the generator and the relative amount of chlorine produced is much less than in the embodiment in which no chlorite is used.

EXAMPLE 12

EXAMPLE 11 is duplicated except that the sodium chlorite solution is fed at a rate of 1,736 lbs. per day of 100% NaClO$_2$ into the water stream downstream from the venturi throat. The water flow was 52 gpm. The effluent from the generator contains 3,373 ppm of chlorine dioxide, 177 ppm of chlorine and 0 ppm of chlorite ion. Based on the anhydrous HCl feed, this corresponds to a yield of 96% of chlorine dioxide.

EXAMPLE 13

EXAMPLE 12 is duplicated except that the aqueous sodium chlorate is fed at a rate of 1,100 lbs. per day of 100% NaClO$_3$, the anhydrous hydrogen chloride is fed at a rate of 750 lbs. per day, and the aqueous sodium chlorite is fed at a rate of 1,010 lbs. per day of 100% NaClO$_2$. The effluent from the generator contains 2,090 ppm of chlorine dioxide, 35 ppm of chlorine and 0 ppm of chlorite ion. A yield of 87% of chlorine dioxide is obtained based on the combined sodium chlorate and sodium chlorite feed.

The additional reactant such as a chlorite solution may also be introduced into the generator concurrently with the driving medium. Thus, an aqueous sodium chlorite solution may be used as the driving medium 13 and introduced into inlet 12 to the venturi nozzle 14.

Thus, the present invention provides a highly efficient rapid process for production of chlorine dioxide with minimal amounts of by-products such as chlorine and chlorite. Because of the efficiency of the process, the present invention for production of six tons of chlorine dioxide is very small, occupying a volume of approximately 150 cubic feet. A 6 ton per day unit based on chlorite typically as disclosed by Hicks et al (U.S. Pat. No. 4,247,531) occupies a volume of approximately 150 cubic feet and a 6 ton per day unit based on chlorate as typically disclosed by Day et al (U.S. Pat. No. 2,484,402) occupies a volume of approximately 14,000 cubic feet. The use of anhydrous hydrogen chloride is a major factor in the present invention and provides significant increases in the yield of chlorine dioxide over the prior art which used only aqueous hydrochloric acid. Thus, the present invention incorporates the advantages of small size, ease of use, rapidity of generation and low capital expenditures of the chlorite process with low cost of materials of the chlorate process.

What is claimed is:

1. A process for the rapid preparation of chlorine dioxide under reduced pressure, consisting essentially of the steps of providing an aqueous chlorate solution, a gaseous stream of substantially anhydrous hydrogen chloride, a column having a venturi therein, the venturi having an inlet and an outlet, a reaction chamber being connected to the column adjacent to the venturi, the reaction chamber being in direct fluid communication with the inlet of the venturi; introducing water into the inlet of the venturi thereby creating a suction effect, introducing the aqueous chlorate and the gaseous stream of substantially anhydrous hydrogen chloride concurrently into the reaction chamber, the approximate stoichiometric ratio of chlorate to hydrogen chloride being 1 to 2, wherein chlorine dioxide is formed in the reaction chamber, the retention time of the chlorate and the substantially anhydrous hydrogen chloride being less than one one-hundredth of a second, the chlorine dioxide being drawn by the suction effect into the venturi such that the mixture of the water and the chlorine dioxide takes place at the inlet of the venturi, the yield of chlorine dioxide being not less than 35% based on the amount of chlorate.

2. The process of claim 1, further comprising introducing a second acid into the reaction zone.

3. The process of claim 2, wherein the second acid is an acid selected from the group consisting of sulfuric acid, aqueous hydrochloric acid, nitric acid, phosphoric acid, acetic acid, alkali earth metal dihydrogen phosphate, metal dihydrogen phosphate, alkali earth metal monohydrogen phosphate, metal monohydrogen phosphate, alkali metal earth monohydrogen sulfate and metal monohydrogen sulfate.

4. The process of claim 3, wherein the second acid introduced is approximately the molar equivalent to the gaseous substantially anhydrous hydrogen chloride.

5. The process of claim 1, wherein the driving medium is a gas.

6. The process of claim 1, wherein the driving medium is a liquid.

7. The process of claim 1, wherein the chlorate solution is sodium chlorate.

8. A process for the rapid preparation of chlorine dioxide under reduced pressure, consisting essentially of the steps of providing an aqueous chlorate solution, a gaseous stream of substantially anhydrous hydrogen chloride, a column having a venturi therein, the venturi having an inlet and an outlet, a reaction chamber being connected to the column adjacent to the venturi, the reaction chamber being in direct fluid communication with the inlet of the venturi; introducing a driving medium into the inlet of the venturi thereby creating a suction effect; introducing the aqueous chlorate solution into the reaction chamber, introducing the gaseous stream of substantially anhydrous hydrogen chloride into the reaction chamber concurrently with introduction of the chlorate solution wherein chlorine dioxide and chlorine are produced within the reaction chamber with a retention time of less than one one-hundredth of a second, introducing an aqueous chlorite solution into the reaction chamber concurrently with the chlorate solution and the gaseous substantially anhydrous hydrogen chloride, wherein the co-produced chlorine is substantially reacted with the chlorite, the chlorine dioxide being drawn by the suction effect into the column at the inlet of the venturi such that the mixture of the driving medium and the chlorine dioxide takes place at the inlet of the venturi.

9. The process of claim 8, wherein the yield of chlorine dioxide, based on the amount of chlorate, is not less than 60%.

10. The process of claim 8, wherein the aqueous solution of chlorite is approximately a 25% solution of sodium chlorite in water.

11. The process of claim 8, wherein the driving medium is a liquid.

12. The process of claim 8, wherein the driving medium is a gas.

13. A process for the rapid preparation of chlorine dioxide under reduced pressure, consisting essentially of the steps of providing an aqueous chlorate solution, a gaseous stream of substantially anhydrous hydrogen chloride, a column having a first end and a second end, a venturi being disposed near the first end of the column, the venturi having an inlet and an outlet, a reaction chamber being connected to the column adjacent to the venturi, the reaction chamber being in direct fluid communication with the inlet of the venturi; introducing a driving medium into the inlet of the venturi thereby creating a suction effect; introducing the aqueous chlorate solution into the reaction chamber, introducing the gaseous stream of substantially anhydrous hydrogen chloride into the reaction chamber concurrently with introduction of the chlorate solution wherein chlorine dioxide and chlorine are produced within the reaction chamber with a retention time of less than one one-hundredth of a second, the chlorine dioxide and chlorine being drawn by the suction effect into the column at the inlet of the venturi nozzle such that mixture of the driving medium, the chlorine dioxide and the chlorine takes place in the column at the inlet of the venturi nozzle, and introducing a chlorite solution in the column near the second end of the column wherein the co-produced chlorine is substantially reacted with the chlorite solution.

* * * * *